United States Patent
Jendbro et al.

(10) Patent No.: US 7,069,145 B2
(45) Date of Patent: Jun. 27, 2006

(54) MOBILE TERMINALS, METHODS, AND PROGRAM PRODUCTS FOR GENERATING A MAGNETIC HEADING BASED ON POSITION

(75) Inventors: Magnus Jendbro, Lund (SE); Gunnar Klinghult, Lund (SE)

(73) Assignee: Sony Ericsson Mobile Communications AB (SE)

( * ) Notice: Subject to any disclaimer, the term of this patent is extended or adjusted under 35 U.S.C. 154(b) by 90 days.

(21) Appl. No.: 10/837,837

(22) Filed: May 3, 2004

(65) Prior Publication Data

US 2005/0246099 A1   Nov. 3, 2005

(51) Int. Cl.
*G01C 17/38* (2006.01)
*G01C 21/00* (2006.01)

(52) U.S. Cl. .................................. 701/207
(58) Field of Classification Search ............... None
See application file for complete search history.

(56) References Cited

U.S. PATENT DOCUMENTS

| 4,212,443 | A | * | 7/1980 | Duncan et al. ............. 244/177 |
| 4,725,957 | A | * | 2/1988 | Alberter et al. ............ 701/224 |
| 5,323,336 | A | * | 6/1994 | Cage ........................... 702/193 |
| 5,604,765 | A | * | 2/1997 | Bruno et al. ................ 375/141 |
| 6,286,222 | B1 | * | 9/2001 | Voto et al. ..................... 33/356 |
| 6,377,211 | B1 | * | 4/2002 | Hsiung ........................ 342/359 |
| 6,826,472 | B1 | * | 11/2004 | Kamei et al. ............... 701/202 |
| 6,860,023 | B1 | * | 3/2005 | Manfred et al. .............. 33/356 |

FOREIGN PATENT DOCUMENTS

JP    11-325904    * 11/1999

* cited by examiner

*Primary Examiner*—Michael J. Zanelli
(74) *Attorney, Agent, or Firm*—Myers Bigel Sibley & Sajovec, PA

(57) ABSTRACT

Mobile terminals, methods, and program products for generating a magnetic heading. A geographic position of the mobile terminal is determined. A magnetic field at the mobile terminal is sensed. A magnetic inclination and/or a magnetic declination of the magnetic field is determined based on the determined geographic position. A magnetic heading is determined for the mobile terminal based on the sensed magnetic field and based on the determined magnetic inclination and/or magnetic declination.

22 Claims, 2 Drawing Sheets

MOBILE TERMINALS, METHODS, AND PROGRAM PRODUCTS FOR GENERATING A MAGNETIC HEADING BASED ON POSITION

BACKGROUND OF THE INVENTION

The present invention relates to the field of global positioning in general and more particularly, to determining the orientation of a mobile terminal.

Some mobile devices include an electronic magnetic compass, which may be used to generate a magnetic heading that is displayed to a user. Example mobile devices that include a magnetic compass include some global position system (GPS) units and some mobile telephones. The magnetic compass may include a two or three axis magnetic field sensor. When using a two axis magnetic field sensor, the mobile device should be aligned with the earth's horizontal surface while the magnetic field strength is measured, otherwise the accuracy of the resulting magnetic heading can be reduced. Aligning the mobile device with the earth's horizontal surface may not be a convenient requirement to place on a user and/or may limit how the mobile device can be mounted on a vehicle or worn by a user.

The mobile device may include two tilt sensors (e.g., each tilt sensor with one axis) that sense the orientation of the mobile device relative to the earth's surface. Information from the tilt sensors can then be combined with information from the magnetic sensor to provide heading information that may be less sensitive to the orientation of the mobile device.

SUMMARY OF THE INVENTION

Mobile terminals, methods, and program products for generating a magnetic heading are provided according to various embodiments of the present invention. A geographic position of the mobile terminal is determined. A magnetic field at the mobile terminal is sensed. A magnetic inclination and/or a magnetic declination of the magnetic field is determined based on the determined geographic position. A magnetic heading is determined for the mobile terminal based on the sensed magnetic field and based on the determined magnetic inclination and/or magnetic declination. Accordingly, the mobile terminal may compensate for its orientation based on the determined magnetic inclination and/or the determined magnetic declination, and may perform such orientation compensation without use of tilt sensors or in combination with one or more tilt sensors. Reducing or eliminating the need for tilt sensors may reduce the complexity and/or cost of the mobile terminal.

In some further embodiments of the present invention, the magnetic inclination and the magnetic declination of the magnetic field may both be determined based on the determined geographic position. The magnetic heading may then be determined based on the sensed magnetic field and both of the determined magnetic inclination and declination. The geographic position may be determined by: receiving satellite signals at the mobile terminal, and by determining the geographic position based on the received satellite signals; by receiving cellular signals at the mobile terminal, and by determining the geographic position based on the received cellular signals; by triangulating the position of the mobile terminal based on wireless communication signals from a plurality of terrestrial wireless communication signal transmitters; by receiving it from a wireless network; and/or by receiving at the mobile terminal country code information and/or cell identification information from a wireless network, and by determining the geographic position based on the received country code information and/or the cell identification information.

In some other embodiments of the present invention, a database is provided in the mobile terminal that contains information on the magnetic inclinations and/or magnetic declinations associated with geographic positions, and the information in the database is used to determine the magnetic inclination and/or the magnetic declination of the magnetic field for a determined geographic position. The magnetic inclination and/or the magnetic declination of the magnetic field may be requesting from a wireless network based on the determined geographic position.

In yet some other embodiments of the present invention, the magnetic heading for the mobile terminal may be determined based on the following equation:

$$C = \begin{bmatrix} Hx \\ Hy \\ Hz \end{bmatrix} \cdot \begin{bmatrix} Ho \cdot \text{Cos}\delta \cdot \text{Cos}\gamma \\ Ho \cdot \text{Sin}\delta \cdot \text{Sin}\gamma \\ Ho \cdot \text{Sin}\delta \end{bmatrix}^{-1},$$

where C is the Direction Cosine Matrix, Hx, Hy and Hz represent the sensed magnetic field, δ represents the determined magnetic inclination, γ represents the determined magnetic declination (based on the current position), and Ho represents an absolute strength of the sensed magnetic field, which is determined based on the following equation:

$$Ho = \sqrt{Hx^2 + Hy^2 + Hz^2}.$$

In some other embodiments of the present invention, a mobile terminal includes a position determination unit, a magnetic field sensor, and a processor. The position determination unit is configured to determine a geographic position of the mobile terminal. The magnetic field sensor is configured to sense a magnetic field at the mobile terminal. The processor unit is configured to determine a magnetic inclination and/or a magnetic declination of the magnetic field based on the determined geographic position, and is configured to determine a magnetic heading for the mobile terminal based on the sensed magnetic field and based on the determined magnetic inclination and/or magnetic declination.

In some further embodiments of the present invention, the processor unit may be configured to determine both the magnetic inclination and the magnetic declination of the magnetic field based on the determined geographic position, and is configured to determine the magnetic heading for the mobile terminal based on the sensed magnetic field and based on both of the determined magnetic inclination and declination. The processor unit may include a memory in which a plurality of geographic locations are associated with a plurality of pairs of magnetic inclinations and a magnetic declinations. The processor unit may be configured to request from a wireless network the magnetic inclination and/or the magnetic declination of the magnetic field based on the determined geographic position. The position determination unit may be configured to determine the geographic position of the mobile terminal by: receiving satellite signals and determining the geographic position terminal based on the received satellite signals; receiving wireless communication signals from a plurality of terrestrial wireless communication signal transmitters, and triangulating the position of the mobile terminal based on the received wireless communication signals; receiving the geographic position of the mobile terminal from a wireless network; receiving country code information and/or cell identification information from a wireless network, and determining the geographic position of the mobile terminal based on the received country code information and/or cell identification information.

In yet some further embodiments of the present invention, the processor unit may determine the magnetic heading for the mobile terminal based on the following equation:

$$C = \begin{bmatrix} Hx \\ Hy \\ Hz \end{bmatrix} \cdot \begin{bmatrix} Ho \cdot \text{Cos}\delta \cdot \text{Cos}\gamma \\ Ho \cdot \text{Sin}\delta \cdot \text{Sin}\gamma \\ Ho \cdot \text{Sin}\delta \end{bmatrix}^{-1} \text{ as defined above.}$$

In some other embodiments of the present invention, a program product for generating a magnetic heading for a mobile terminal includes code configured to determine a magnetic inclination and/or a magnetic declination of the magnetic field based on a geographic position of the mobile terminal, and code configured to determine a magnetic heading for the mobile terminal based on the sensed magnetic field and based on the determined magnetic inclination and/or the magnetic declination. The program product may further include code configured to determine the magnetic heading for the mobile terminal based on the following equation:

$$C = \begin{bmatrix} Hx \\ Hy \\ Hz \end{bmatrix} \cdot \begin{bmatrix} Ho \cdot \text{Cos}\delta \cdot \text{Cos}\gamma \\ Ho \cdot \text{Sin}\delta \cdot \text{Sin}\gamma \\ Ho \cdot \text{Sin}\delta \end{bmatrix}^{-1} \text{ as defined above.}$$

DETAILED DESCRIPTION

Figure 1:
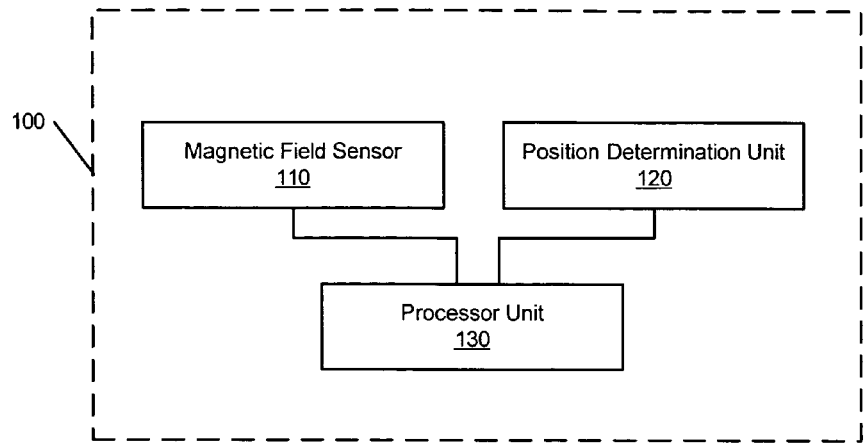
FIG. 1 is a schematic block diagram illustrating a mobile terminal according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to receive communication signals via a wireless interface from, for example, a GPS system, a cellular network, a Wide Area Network, wireless local area network (WLAN), and/or another RF communication device. Examples of mobile terminals include, but are not limited to, an electronic magnetic compass with a wireless receiver; a GPS positioning receiver; a cellular mobile terminal; a personal communication terminal that may combine a cellular mobile terminal with data processing, facsimile and data communications capabilities; a personal data assistance (PDA) that can include a wireless receiver, Internet/intranet access, local area network interface, wide area network interface, and/or Web browser; and a mobile or fixed computer or other device that includes a wireless receiver.

While various embodiments of the invention are described herein with reference to GPS receivers and signals from GPS satellites, it will be appreciated that they are applicable to positioning systems which utilize pseudolites or a combination of satellites and pseudolites. Pseudolites are ground based transmitters that broadcast a signal similar to a traditional satellite-sourced GPS signal modulated on an L-band carrier signal, generally synchronized with GPS time. Pseudolites may be useful in situations where GPS signals from orbiting GPS satellites might not be available, such as tunnels, mines, buildings or other enclosed areas. The term satellite, as used herein, is intended to include pseudolites or equivalents of pseudolites, and the term GPS signals and GPS receivers, as used herein, is intended to include GPS-like signals from pseudolites or equivalents of pseudolites and receivers that are capable of receiving those signals. Also, while the following discussion references the United States GPS system, various embodiments herein can be applicable to similar satellite positioning systems, such as the GLONASS system or GALILEO system. The term "GPS", as used herein, includes such alternative satellite positioning systems, including the GLONASS system and the GALILEO system.

FIG. 1 is a schematic block diagram of a mobile terminal 100 according to some embodiments of the invention. The mobile terminal 100 includes a magnetic field sensor 110, a position determination unit 120, and a processor unit 130. The magnetic field sensor 110 senses the local magnetic field at the mobile terminal 100 and generates magnetic field information that is indicative of the magnetic field, and which may indicate the strength of the sensed magnetic field along three axes. The position determination unit 120 determines a geographic position of the mobile terminal 100.

The position determination unit 120 can determine the position of the mobile terminal 100 based on, for example, uplink signal location operations, downlink signal location operations, GPS based operations, and/or assisted GPS operations that combine terrestrial wireless communication signals, such as Wide Area Network (WAN) signals and/or Local Area Network (LAN) signals, and GPS signals to determine its geographic position. For uplink signal based position determination, the mobile terminal 100 determines its position based on ranging measurement and triangulation of one of more wireless signals it transmits to a plurality of terrestrial receivers. The position of the mobile terminal 100 may thereby be determined by a wireless network associated with the terrestrial receivers and communicated to the mobile terminal. For downlink signal based position determination the mobile terminal 100 determines its position based on ranging measurements and triangulation of wireless signals it receives from a plurality of terrestrial transmitters. The terrestrial transmitters can include cellular base stations, WAN transmitters such as digital TV signal broadcast towers, and/or LAN transmitters such as 802.11 based wireless routers. The uplink signal and/or downlink signal based position determination can be further based on, for example, a Time of Arrival (TA) operations, Observed Time Difference of Arrival (OTDOA), Enhanced Observed Time Difference (EOTD) technique. Alternatively or additionally, the mobile terminal 100 may receive country code information and/or cell identification information, which is associated with a known geographic area, from a wireless network (e.g., cellular network) and it may determine its location based of the received information.

The processor unit 130 determines the magnetic inclination and/or the magnetic declination of the sensed magnetic field based on the determined geographic position of the mobile terminal 100. The magnetic inclination is based on the angle that the magnetic field makes with the plane of the earth's horizon. The magnetic declination is based on the angle between magnetic north (the direction the needle of a compass points) and true north (the axis around which the earth rotates). The processor unit 130 may determine the magnetic inclination and/or the magnetic declination of the magnetic field by referencing a database within the mobile terminal 100 and/or by requesting the information from a wireless network, such as, for example, via a General Packet Radio Service (GPRS) packet network communication connection to an online service. The database in the mobile terminal 100 may be, for example, within a memory in the processor unit 130 and may include magnetic inclination and/or magnetic declination values associated with a plurality of geographic positions. The term "database" as used herein refers to any known association of magnetic inclination and/or the magnetic declination values with geographic position, and includes, but is not limited, to tables of data residing in a memory. Alternatively or additionally, the processor unit 130 may communicate its determined geographic position to a wireless network with a request for the associated magnetic inclination and/or magnetic declination values.

The processor unit 130 determines a magnetic heading for the mobile terminal 100 based on the magnetic field information from the magnetic field sensor 110 and based on the magnetic inclination and/or magnetic declination associated with the determined geographic position. Accordingly, in some embodiments of the present invention, the processor unit 130 determines and uses both the magnetic inclination and the magnetic declination of the magnetic field to determine a magnetic heading, and in some other embodiments the processor unit 130 determines and uses only the magnetic inclination or only the magnetic declination of the magnetic field.

Figure 2:
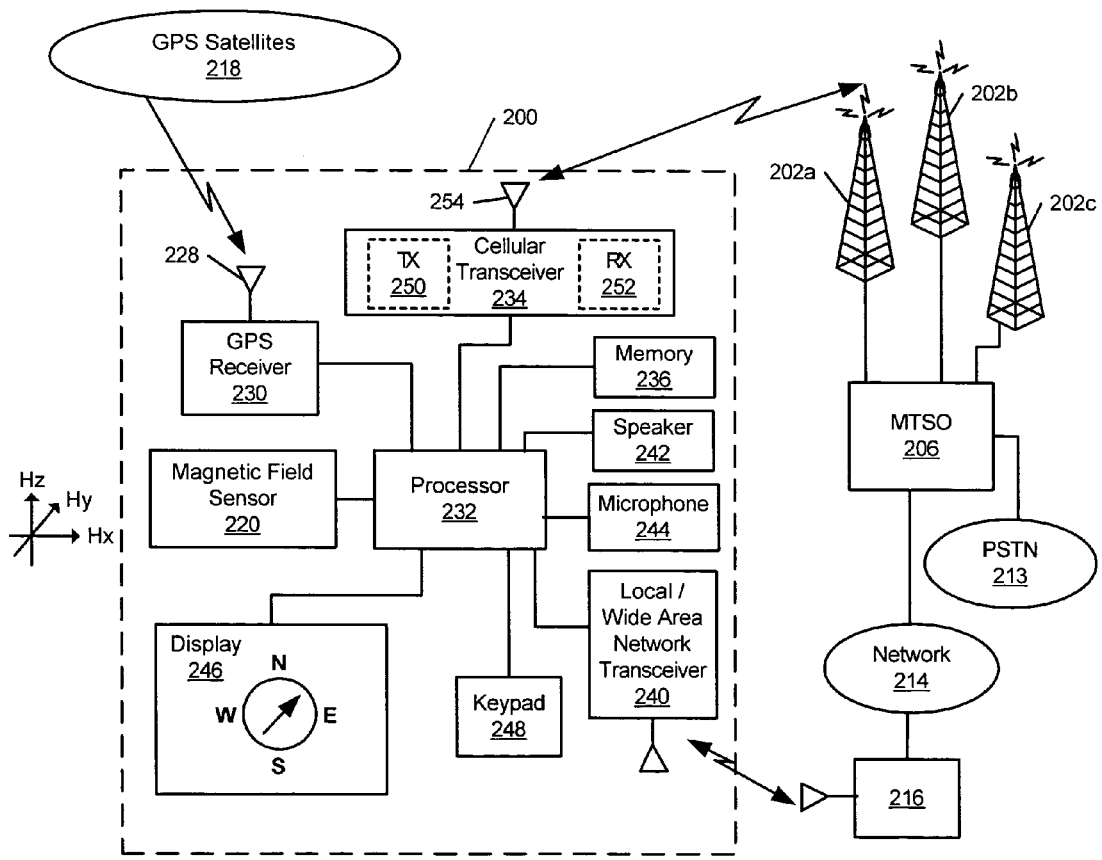
FIG. 2 is a schematic block diagram illustrating a wireless communication system including a mobile terminal according to some embodiments of the present invention.

For example, the magnetic field sensor 110 may sense the local magnetic field at the mobile terminal 100 and generate Hx, Hy and Hz values that represent the strength of the sensed magnetic field along the three axes illustrated in FIG. 2. The processor unit 130 determines the magnetic inclination $\delta$ and the magnetic declination $\gamma$, and determines the absolute strength of the sensed magnetic field Ho based on the equation $Ho=\sqrt{Hx^2+Hy^2+Hz^2}$. The processor unit 130 then determines the magnetic heading for the mobile terminal 100 based on the following equation:

$$C = \begin{bmatrix} Hx \\ Hy \\ Hz \end{bmatrix} \cdot \begin{bmatrix} Ho \cdot \cos\delta \cdot \cos\gamma \\ Ho \cdot \sin\delta \cdot \sin\gamma \\ Ho \cdot \sin\delta \end{bmatrix}^{-1},$$

where C is the Direction Cosine Matrix, and the other terms are as defined above. Although the magnetic field sensor 110, the position determination unit 120, and the processor unit 130 are illustrated in FIG. 1 as separate functional blocks, it is to be understood that, according to various other embodiments of the invention, two or more of them may be combined into a single unit, and/or the functionality of one or more of them may be spread across more than one sensor or unit.

FIG. 2 is a schematic block diagram of a wireless communication system that includes a wireless terminal 200 that receives wireless communication signals from GPS satellites 218 and communicates wireless signals with cellular base stations 202a–c and/or a wireless local/wide area network 216. The cellular base stations 202a–c are connected to a Mobile Telephone Switching Office (MTSO) 206 wireless network, which, in turn, is connected to a PSTN 213, and a network 214 (e.g., Internet). The mobile terminal 200 may communicate with the wireless local/wide area network 216 using a communication protocol that may include, but is not limited to, 802.11a, 802.11b, 802.11e, 802.11g, 802.11i, and/or other wireless local area network protocols and/or may receive wide area signals as, for example, digital TV signals and/or digital radio signals. The wireless local/wide area network 216 may be connected to the network 214.

In some embodiments of the present invention, the mobile terminal 200 includes a magnetic field sensor 220, a GPS receiver 230, a processor 232, a cellular transceiver 234, a memory 236, a local/wide area network transceiver 240, and may also include a speaker 242, a microphone 244, a display 246 and a keypad 248. The GPS receiver 230 can determine position based on GPS signals that are received via an antenna 228. The local/wide area network transceiver 240 can receive, and may also transmit, signals to the wireless local/wide area network 216, and may request therefrom information on the position of the mobile terminal 200.

According to some embodiments of the invention, the GPS receiver 230, the cellular transceiver 234, the local/wide area network transceiver 240, and/or portions of the processor 232 may correspond to the position determination unit 120 that is shown in FIG. 1. Portions of the processor 232 and the memory 236 may correspond to the processor unit 130 that is shown in FIG. 1.

The memory 236 may store software that is executed by the processor 232, and may include one or more erasable programmable read-only memories (EPROM or Flash EPROM), battery backed random access memory (RAM), magnetic, optical, or other digital storage device, and may be separate from, or at least partially within, the processor 232. The memory 236 may include a database of magnetic inclination and/or magnetic declination values that are associated with a plurality of geographic positions. The processor 232 may then determine the magnetic inclination and/or the magnetic declination of the magnetic field that is sensed by the magnetic field sensor 220 by referencing the database in the memory 236 and/or by communicating its determined geographic position to, and requesting the magnetic inclination and/or magnetic declination information from, a wireless network, such as, for example, via a GPRS packet network communication connection through the MTSO 206 and/or via the wireless local/wide area network 216 to an Internet service connected to the network 214. The processor 232 may include more than one processor, such as, for example, a general purpose processor and/or a digital signal processor, which may be enclosed in a common package or separate and apart from one another.

The cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with one or more of the base stations 202a–c using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments of the present invention, the antennas 228 and 254 may be a single antenna.

The magnetic field sensor 220 measures the strength of the magnetic field along three axes at the mobile terminal 200 and generates corresponding magnetic field information values Hx, Hy, and Hz. The processor 232 can determine a magnetic heading for the mobile terminal 200 based on the magnetic field information values Hx, Hy, and Hz and the determined magnetic inclination and/or magnetic declination based on the operations described above with regard to FIG. 1. The magnetic heading can be displayed as a compass heading on the display 236, such as illustrated within the display 236 in FIG. 2.

The magnetic field that is sensed by the magnetic field sensor 220 may include interference from one or more of the other components of the mobile telephone 200, such as from the speaker 242 and/or the transceivers 234 and 240. Such interference may be known or can be determined by calibration during operation, and the magnetic field sensor 220 and/or the processor 232 may remove at least some of the interference from the generated magnetic field information values Hx, Hy, and Hz. Removing such interface may allow more accurate determination of the magnetic heading.

Although the mobile terminal 200 may determine its magnetic heading without using tilt sensors, it may also include one or more tilt sensors that can generate information on the orientation (e.g., tilt angle) of the mobile terminal 200 relative to earth. The processor 232 may then combine the orientation information with the determined magnetic inclination and/or magnetic declination to determine the magnetic heading of the mobile terminal 200. For example, orientation information from a one single tilt sensor may be combined with the determined magnetic inclination to determine the magnetic heading, and/or the orientation information may be combined with the determined magnetic declination to determine the magnetic heading.

Figure 3:
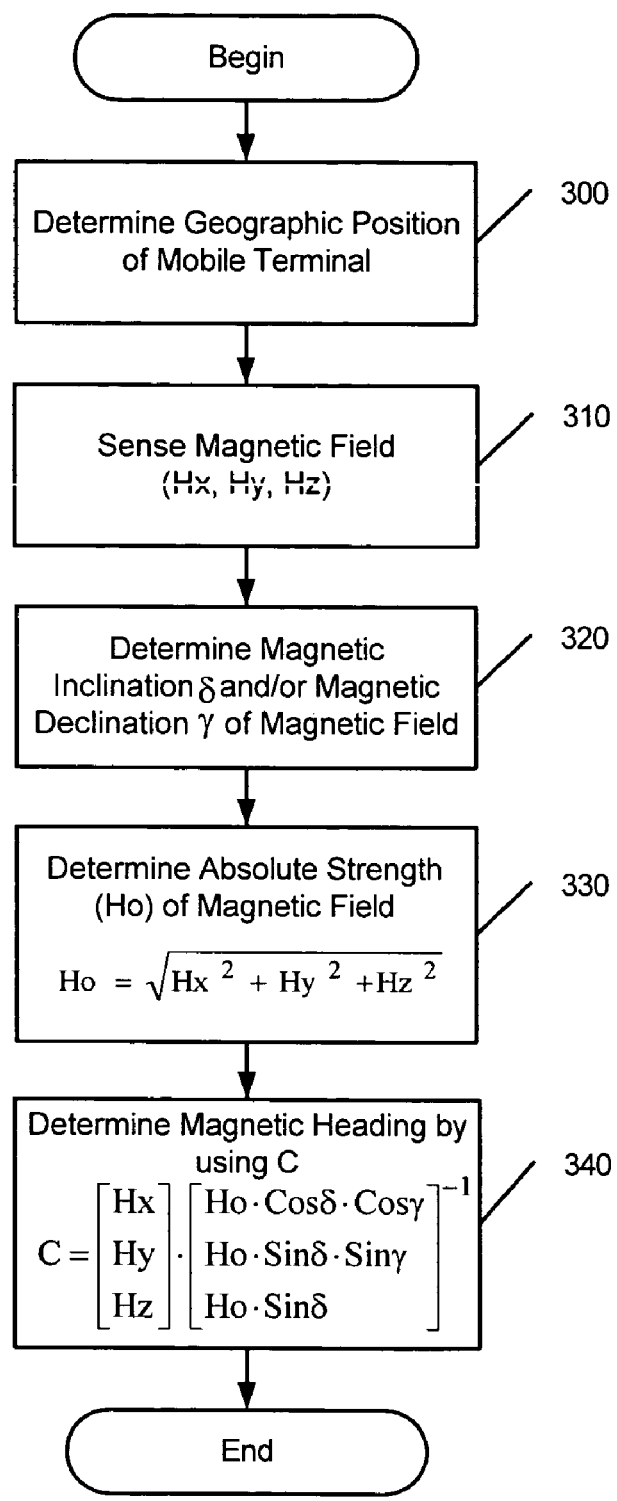
FIG. 3 is a flowchart illustrating operations for determining the magnetic heading of a mobile terminal according to some embodiments of the invention.

FIG. 3 is a flowchart illustrating operations for determining a magnetic heading of a mobile terminal according to some embodiments of the present invention. At Block 300, the geographic position of the mobile terminal is determined. At Block 310, the magnetic field (Hx, Hy, Hz) of the magnetic field is sensed. At Block 320, the magnetic inclination δ and/or the magnetic declination γ are determined. At Block 330, the absolute strength (Ho) of the sensed magnetic field is determined based on the equation $Ho = \sqrt{Hx^2 + Hy^2 + Hz^2}$. At Block 340, the magnetic heading is determined based on the following equation:

$$C = \begin{bmatrix} Hx \\ Hy \\ Hz \end{bmatrix} \cdot \begin{bmatrix} Ho \cdot \text{Cos}\delta \cdot \text{Cos}\gamma \\ Ho \cdot \text{Sin}\delta \cdot \text{Sin}\gamma \\ Ho \cdot \text{Sin}\delta \end{bmatrix}^{-1},$$

where C is the Direction Cosine Matrix, and the other terms are as defined above. In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for generating a magnetic heading for a mobile terminal, comprising:
   determining a geographic position of the mobile terminal;
   sensing a magnetic field at the mobile terminal;
   determining a magnetic inclination and/or a magnetic declination of the magnetic field based on the determined geographic position; and
   determining a magnetic heading for the mobile terminal based on the sensed magnetic field while compensating for orientation of the mobile terminal relative to Earth based on the determined magnetic inclination and/or magnetic declination without use of information from sensors that sense orientation of the mobile terminal relative to Earth.

2. The method of claim 1, wherein:
   determining a magnetic inclination and/or a magnetic declination comprises determining the magnetic inclination and the magnetic declination of the magnetic field based on the determined geographic position; and
   determining a magnetic heading comprises determining the magnetic heading for the mobile terminal based on the sensed magnetic field and based on the determined magnetic inclination and the determined magnetic declination.

3. The method of claim 1, wherein determining a geographic position of the mobile terminal comprises:
   receiving satellite signals at the mobile terminal; and determining the geographic position based on the received satellite signals.

4. The method of claim 1, wherein determining a geographic position of the mobile terminal comprises:
receiving cellular signals at the mobile terminal; and
determining the geographic position based on the received cellular signals.

5. The method of claim 1, wherein determining a geographic position of the mobile terminal comprises triangulating the position of the mobile terminal based on wireless communication signals from a plurality of terrestrial wireless communication signal transmitters.

6. The method of claim 1, wherein determining a geographic position of the mobile terminal comprises receiving the geographic position of the mobile terminal from a wireless network.

7. The method of claim 1, wherein determining a geographic position of the mobile terminal comprises:
receiving at the mobile terminal country code information and/or cell identification information from a wireless network; and
determining the geographic position based on the received country code information and/or cell identification information.

8. The method of claim 1, wherein determining a magnetic inclination and/or a magnetic declination of the magnetic field based on the determined geographic position comprises:
providing in the mobile terminal a database of information on the magnetic inclinations and/or magnetic declinations that are associated with geographic positions; and
determining the magnetic inclination and/or the magnetic declination of the magnetic field for a determined geographic position based on information in the database.

9. The method of claim 1, wherein determining a magnetic inclination and/or a magnetic declination of the magnetic field based on the determined geographic position comprises requesting from a wireless network the magnetic inclination and/or the magnetic declination of the magnetic field based on the determined geographic position.

10. The method of claim 1, wherein determining a magnetic heading for the mobile terminal comprises determining the magnetic heading based on the following equation:

$$C = \begin{bmatrix} Hx \\ Hy \\ Hz \end{bmatrix} \cdot \begin{bmatrix} Ho \cdot Cos\delta \cdot Cos\gamma \\ Ho \cdot Sin\delta \cdot Sin\gamma \\ Ho \cdot Sin\delta \end{bmatrix}^{-1},$$

wherein C comprises the Direction Cosine Matrix, Hx, Hy and Hz comprise components of the sensed magnetic field, $\delta$ comprises the determined magnetic inclination, and $\gamma$ comprises the determined magnetic declination, and wherein Ho comprises an absolute strength of the sensed magnetic field based on the following equation:

$$Ho = \sqrt{Hx^2 + Hy^2 + Hz^2}.$$

11. The method of claim 1, wherein determining a magnetic heading for the mobile terminal comprises removing at least some known electronic interference from the sensed magnetic field.

12. A mobile terminal comprising:
a position determination unit that is configured to determine a geographic position of the mobile terminal;
a magnetic field sensor that is configured to sense a magnetic field at the mobile terminal; and
a processor unit that is configured to determine a magnetic inclination and/or a magnetic declination of the magnetic field based on the determined geographic position, and that is configured to determine a magnetic heading for the mobile terminal based on the sensed magnetic field while compensating for orientation of the mobile terminal relative to Earth based on the determined magnetic inclination and/or magnetic declination without use of information from sensors that sense orientation of the mobile terminal relative to Earth.

13. The mobile terminal of claim 12, wherein the processor unit is configured to determine a magnetic inclination and a magnetic declination of the magnetic field based on the determined geographic position, and is configured to determine a magnetic heading for the mobile terminal based on the sensed magnetic field and based on the determined magnetic inclination and magnetic declination.

14. The mobile terminal of claim 12, wherein the processor unit comprises a memory in which a plurality of geographic locations are associated with a plurality of pairs of magnetic inclinations and magnetic declinations.

15. The mobile terminal of claim 12, wherein the processor unit is configured to request from a wireless network the magnetic inclination and/or the magnetic declination of the magnetic field based on the determined geographic position.

16. The mobile terminal of claim 12, wherein the position determination unit is configured to receive satellite signals, and is configured to determine the geographic position of the mobile terminal based on the received satellite signals.

17. The mobile terminal of claim 12, wherein the position determination unit is configured to receive wireless communication signals from a plurality of terrestrial wireless communication signal transmitters, and is configured to triangulate the position of the mobile terminal based on the received wireless communication signals.

18. The mobile terminal of claim 12, wherein the position determination unit is configured to receive the geographic position of the mobile terminal from a wireless network.

19. The mobile terminal of claim 12, wherein the position determination unit is configured to receive country code information and/or cell identification information from a wireless network, and is configured to determine the geographic position of the mobile terminal based on the received country code information and/or cell identification information.

20. The mobile terminal of claim 12, wherein the processor unit is configured to determine the magnetic heading for the mobile terminal based on the following equation:

$$C = \begin{bmatrix} Hx \\ Hy \\ Hz \end{bmatrix} \cdot \begin{bmatrix} Ho \cdot Cos\delta \cdot Cos\gamma \\ Ho \cdot Sin\delta \cdot Sin\gamma \\ Ho \cdot Sin\delta \end{bmatrix}^{-1},$$

wherein C comprises the Direction Cosine Matrix, Hx, Hy and Hz comprise components of the sensed magnetic field, $\delta$ comprises the determined magnetic inclination, and $\gamma$ comprises the determined magnetic declination, and wherein Ho comprises an absolute strength of the sensed magnetic field based on the following equation:

$$Ho = \sqrt{Hx^2 + Hy^2 + Hz^2}.$$

21. A program product for generating a magnetic heading for a mobile terminal, the program product comprising code embodied in a processor-readable medium, the code comprising:
- code configured to receive a sensed magnetic field;
- code configured to determine a magnetic inclination and/or a magnetic declination of the magnetic field based on a geographic position of the mobile terminal; and
- code configured to determine a magnetic heading for the mobile terminal based on the sensed magnetic field while compensating for orientation of the mobile terminal relative to Earth based on the determined magnetic inclination and/or the magnetic declination without use of information from sensors that sense orientation of the mobile terminal relative to Earth.

22. The program product of claim 21, further comprising code configured to determine the magnetic heading for the mobile terminal based on the following equation:

$$C = \begin{bmatrix} Hx \\ Hy \\ Hz \end{bmatrix} \cdot \begin{bmatrix} Ho \cdot \cos\delta \cdot \cos\gamma \\ Ho \cdot \sin\delta \cdot \sin\gamma \\ Ho \cdot \sin\delta \end{bmatrix}^{-1}$$

wherein C comprises the Direction Cosine Matrix, Hx, Hy and Hz comprise the sensed magnetic field, $\delta$ comprises the determined magnetic inclination, and $\gamma$ comprises the determined magnetic declination, and wherein Ho comprises an absolute strength of the sensed magnetic field based on the following equation:

$$Ho = \sqrt{Hx^2 + Hy^2 + Hz^2}.$$

* * * * *